US011163345B2

(12) United States Patent
Leva et al.

(10) Patent No.: US 11,163,345 B2
(45) Date of Patent: Nov. 2, 2021

(54) ELECTRONIC DEVICE TO CONTROL TEMPERATURE AND COMPUTING PERFORMANCE OF AT LEAST ONE PROCESSING UNIT AND SYSTEM AND METHOD THEREOF

(71) Applicant: POLITECNICO DI MILANO, Milan (IT)

(72) Inventors: Alberto Leva, Milan (IT); Federico Terraneo, Giussano (IT); William Fornaciari, Parma (IT)

(73) Assignee: POLITECNICO DI MILANO, Milan (IT)

( * ) Notice: Subject to any disclaimer, the term of this patent is extended or adjusted under 35 U.S.C. 154(b) by 304 days.

(21) Appl. No.: 15/998,555

(22) PCT Filed: Feb. 15, 2016

(86) PCT No.: PCT/IT2016/000037
§ 371 (c)(1),
(2) Date: Aug. 15, 2018

(87) PCT Pub. No.: WO2017/141277
PCT Pub. Date: Aug. 24, 2017

(65) Prior Publication Data
US 2019/0179383 A1     Jun. 13, 2019

(51) Int. Cl.
*G06F 1/20* (2006.01)
*G06F 1/3287* (2019.01)
(Continued)

(52) U.S. Cl.
CPC .............. *G06F 1/206* (2013.01); *G06F 1/324* (2013.01); *G06F 1/3206* (2013.01);
(Continued)

(58) Field of Classification Search
CPC ...... G06F 1/324; G06F 1/3287; G06F 1/3296; G06F 1/3206; G06F 1/206
See application file for complete search history.

(56) References Cited

U.S. PATENT DOCUMENTS

| 2009/0006901 A1* | 1/2009 | Brey | G06F 1/26 |
| | | | 714/47.1 |
| 2011/0302582 A1* | 12/2011 | Jacobson | G06F 1/206 |
| | | | 718/102 |

(Continued)

OTHER PUBLICATIONS

Leva Alberto et al: "Event-based thermal control for high-density processors",2015 International Conference on Event-Based Control, Communication, and Signal Processing (EBCCSP), IEEE, Jun. 17, 2015 (Jun. 17, 2015), pp. 1-8, XP032795390.
(Continued)

*Primary Examiner* — Jaweed A Abbaszadeh
*Assistant Examiner* — Gayathri Sampath
(74) *Attorney, Agent, or Firm* — Workman Nydegger

(57) ABSTRACT

It is disclosed an electronic device to control temperature and computing performance of at least one processing unit. An event generation module is configured to receive an internal temperature signal representative of the internal temperature of the processing unit and to generate an event signal indicating the need to recalculate the value of at least one control signal controlling the computing performance of the processing unit and its dissipated thermal power. An event management module is configured to receive the event signal, calculate a control action for controlling the computing performance of the processing unit and the dissipated thermal power thereof, and generate a first candidate driving signal carrying said control action. An operating module is configured to receive the first candidate driving signal and to generate the at least one control signal as a function of the first candidate driving signal.

13 Claims, 8 Drawing Sheets

(51) Int. Cl.
*G06F 1/3206* (2019.01)
*G06F 1/324* (2019.01)
*G06F 1/3296* (2019.01)

(52) U.S. Cl.
CPC .......... *G06F 1/3287* (2013.01); *G06F 1/3296* (2013.01); *Y02D 10/00* (2018.01)

(56) References Cited

U.S. PATENT DOCUMENTS

| | | | | |
|---|---|---|---|---|
| 2013/0297094 A1* | 11/2013 | Yao | ....................... | G06F 1/3296 |
| | | | | 700/299 |
| 2013/0345892 A1* | 12/2013 | Lin | .................. | H03K 19/00369 |
| | | | | 700/299 |
| 2016/0062421 A1* | 3/2016 | Sugawara | .............. | G05B 15/02 |
| | | | | 700/299 |

OTHER PUBLICATIONS

Gunga H C et al: "A non-invasive device to continuously determine heat strain in humans", 2008 (Jul. 1, 2008), pp. 297-307, XP088709324, ISSN: 0306-4565, DOI: 10.1016/J.JTHERBI0.2008.03.004 [retrieved on Apr. 1, 2008] p. 299, col. 2, paragraph 2-p. 302, col. 2, paragraph 1; figure 2.
PCT/IT2016/000037, dated Oct. 31, 2016, International Report and Written Opinion.

\* cited by examiner

ELECTRONIC DEVICE TO CONTROL TEMPERATURE AND COMPUTING PERFORMANCE OF AT LEAST ONE PROCESSING UNIT AND SYSTEM AND METHOD THEREOF

BACKGROUND

Technical Field

The present disclosure generally relates to the electronic field.

More in particular, the present disclosure concerns an electronic device for controlling temperature and computing performance of at least one processing unit and method thereof.

Description of the Related Art

The increase in the computing performance of modern processors is the cause of high thermal stress, which reduces the reliability of processors over time and can even instantly damage them in cases of particularly high levels of thermal stress.

Therefore, performing a thermal control of the temperature of a processor is necessary to prevent an excessive increase in the temperature of the processor from damaging it instantly or excessively reducing the lifetime thereof.

Thermal control is particularly needed in integrated circuits with a three-dimensional layout both because the heat generated by the integrated components is dissipated in a smaller area with respect to that of integrated circuits with a two-dimensional layout, and because there are layers of silicon that are not in direct contact with the heat sink.

There are known prior art techniques for controlling the temperature of processors, utilizing control schemes with fixed sampling frequency.

The Applicant has observed that said prior art techniques have the disadvantage that the use of a fixed sampling period can have a value too large, which is such to not ensure reaction times that are sufficiently fast to avoid the risk of damaging or degrading the operation of the controlled processor.

On the other hand, the choice of a sampling period that is too short allows to fulfill the reaction time constraints, but it generates an excessive computational load, for example in terms of a large number of interrupts in the time unit.

In addition, the prior art techniques have at least one of the following disadvantages:
they do not adapt to the various operating conditions of the processor;
in the case wherein a rapid reaction is necessary, they increase the computational load excessively;
they offer little flexibility with respect to the various operating conditions that can arise, for example in smartphones, tablets or workstations;
they depend upon the particular operating system utilized;
they are too complex to be implemented.

BRIEF SUMMARY

The present disclosure concerns an electronic device to control temperature and computing performance of at least one processing unit as defined in the enclosed claim 1 and by its the preferred embodiments disclosed in the dependent claims from 2 to 8.

The Applicant has perceived that the electronic control device according to the present disclosure has the following advantages:
it reduces the risk of damaging the operation of the at least one processing unit;
it reduces the risk of premature aging of the at least one processing unit;
it improves the reliability over time of the at least one processing unit;
it intrinsically optimizes the computational load of the thermal control, concentrating it at the times wherein it is necessary;
it improves the flexibility of the temperature control scheme, adapting to the various operating conditions of the at least one processing unit;
it is independent of the particular operating system utilized;
it is simple to implement.

One embodiment of the present disclosure relates to a system to control temperature and computing performance of at least one processing unit as defined in the enclosed claim 9 and by its preferred embodiments disclosed in the dependent claims 10 and 11.

One embodiment of the present disclosure relates to a method for controlling temperature and computing performance of at least one processing unit as defined in the enclosed claim 12 and by its preferred embodiments disclosed in the dependent claims from 13 to 15.

DETAILED DESCRIPTION

It is observed that in the description below identical or similar blocks, components or modules are indicated by the same numerical references in the figures, even if they are appear in different embodiments of the disclosure.

Figure 1:
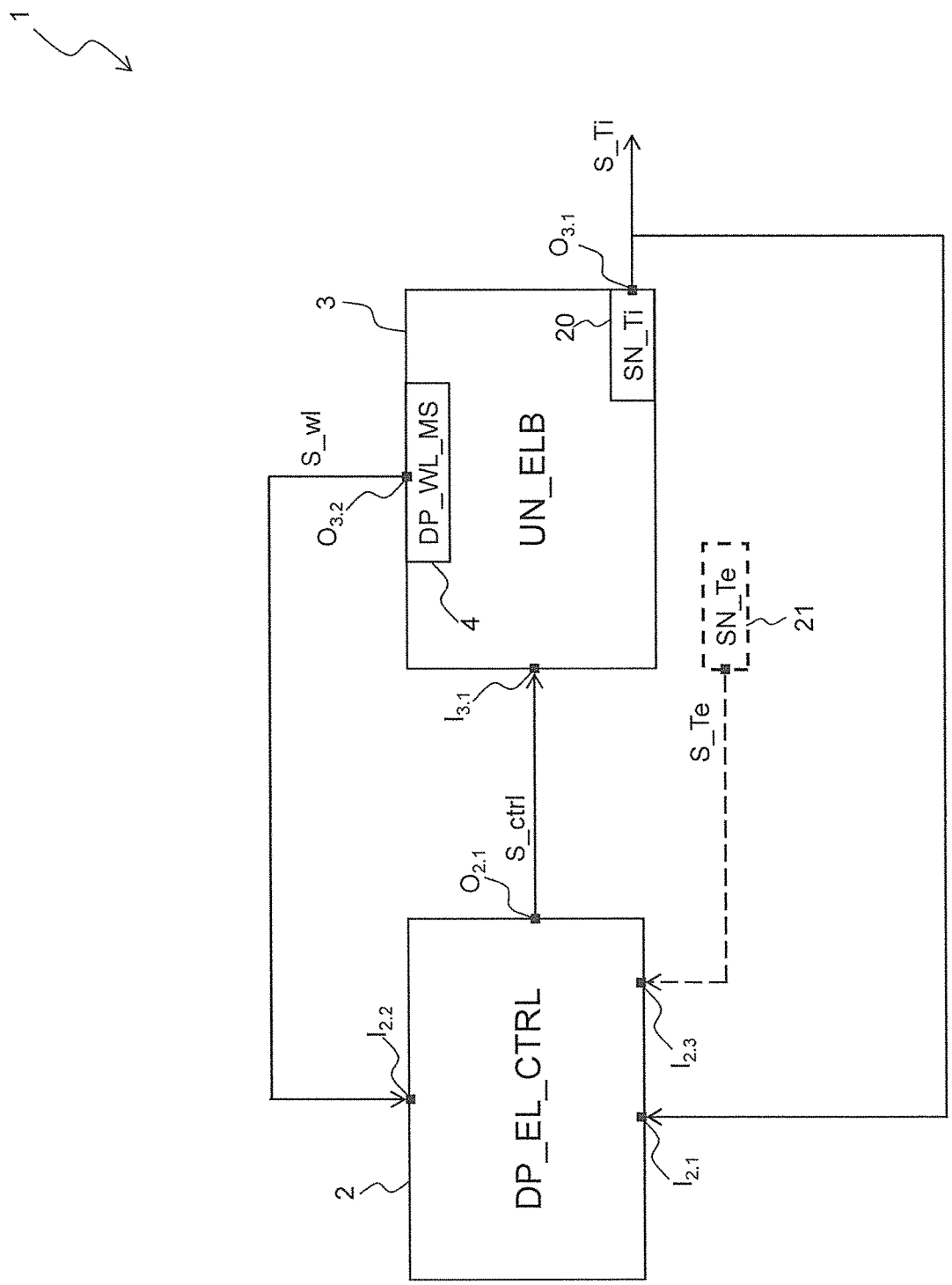
FIG. 1 is a block diagram of a system to control temperature and computing performance of a processing unit according to the disclosure.

With reference to FIG. 1, it shows the block diagram of a system 1 to control the temperature of a processing unit 3.

The control system 1 comprises:

an electronic device 2 to control temperature and computing performance;

the processing unit 3.

The electronic control device 2 can be implemented partly in hardware and partly in software, or entirely in software or entirely in hardware, as shall be explained in further detail below.

The control system 1 can be positioned for example inside one of the following devices:

a desktop or laptop personal computer;

a smartphone;

a tablet;

a server.

The processing unit 3 can be of one of the following devices:

a processor for a desktop or laptop personal computer, smartphone, tablet or server;

a graphics processor for a desktop or laptop personal computer, smartphone, tablet or server.

Moreover, the processing unit can be only one or it can be composed of a plurality of processing units, as shall be explained in further detail below regarding the sixth variant of the disclosure.

The electronic control device 2 has the function of controlling the thermal power dissipated by the processing unit 3 and its computing performance, by means of a thermal control scheme that is event-based ("event-based control") and by means of an "override" type of control.

In other words, the event-based thermal control scheme is not activated with a fixed frequency (e.g. periodically), but it is activated only when necessary, that is when particular conditions correlated with the operating temperature of the processing unit 3 occur.

The electronic control device 2 comprises:

a first input terminal $I_{2.1}$ adapted to receive an internal temperature signal S_Ti representative of the current internal temperature associated with the processing unit 3;

a second input terminal $I_{2.2}$ adapted to receive a computational load signal S_wl representative of the computational load of the processing unit 3;

an output terminal $O_{2.1}$ adapted to transmit a control signal S_ctrl indicating a control action that affects the computing performance and the thermal power dissipated by the processing unit 3.

The computational load signal S_wl is measured for example as the percentage of time (referring to a defined and configurable interval of time) during which the processing unit 3 is active, that is during which it performs any data processing.

The computational load signal S_wl is generated for example by means of the combination of a load measurement circuit 4 positioned inside the processing unit 3 and the operating system running on the processing unit 3, wherein the operating system processes the data generated by the load measurement circuit 4 and it generates therefrom the computational load signal S_wl as output.

For example, a load measurement circuit 4 is a dedicated counter operating by receiving the clock signal of the processing unit 3 as input.

The internal temperature signal S_Ti is for example representative of an estimation of the current temperature of the core of the processing unit 3.

The processing unit 3 comprises:

a first input terminal $I_{3.1}$ adapted to receive the control signal S_ctrl from the electronic control device 2;

a first output terminal $O_{3.1}$ adapted to transmit the internal temperature signal S_Ti;

a second output terminal $O_{3.2}$ adapted to transmit the computational load signal S_wl.

Therefore the electronic control device 2 is electrically connected to the processing unit 3 by means of the control signal S_ctrl and by means of the internal temperature signal S_Ti.

Advantageously, the control action (carried by the control signal S_ctrl) for controlling the computing performance and the dissipated thermal power is selected from the following types:

clock gating: in this technique it is controlled the clock tree of the synchronous circuits that implement the processing unit 3, with the purpose of disabling part of the synchronous circuits or reducing the operating frequency of said portions;

Dynamic Voltage and Frequency Scaling (abbreviated as DVFS): in this technique it is dynamically changed the value of the supply voltage and of the operating frequency of the synchronous circuits implementing the processing unit 3.

The processing unit 3 comprises an internal temperature sensor 20 configured to generate an internal temperature signal S_Ti representative of the internal temperature associated with the processing unit 3.

For example, the value of the internal temperature signal S_Ti represents an estimation of the temperature of the active layer of silicon on which the processing unit 3 is implemented.

FIG. 1 shows that the temperature sensor 20 is integrated inside the processing unit 3, but alternatively the temperature sensor 20 can also be positioned outside of the processing unit 3 and electrically and thermally connected to it: in this case, the electronic control device 2 is such to receive the internal temperature signal S_Ti generated by the external temperature sensor.

Figure 2:
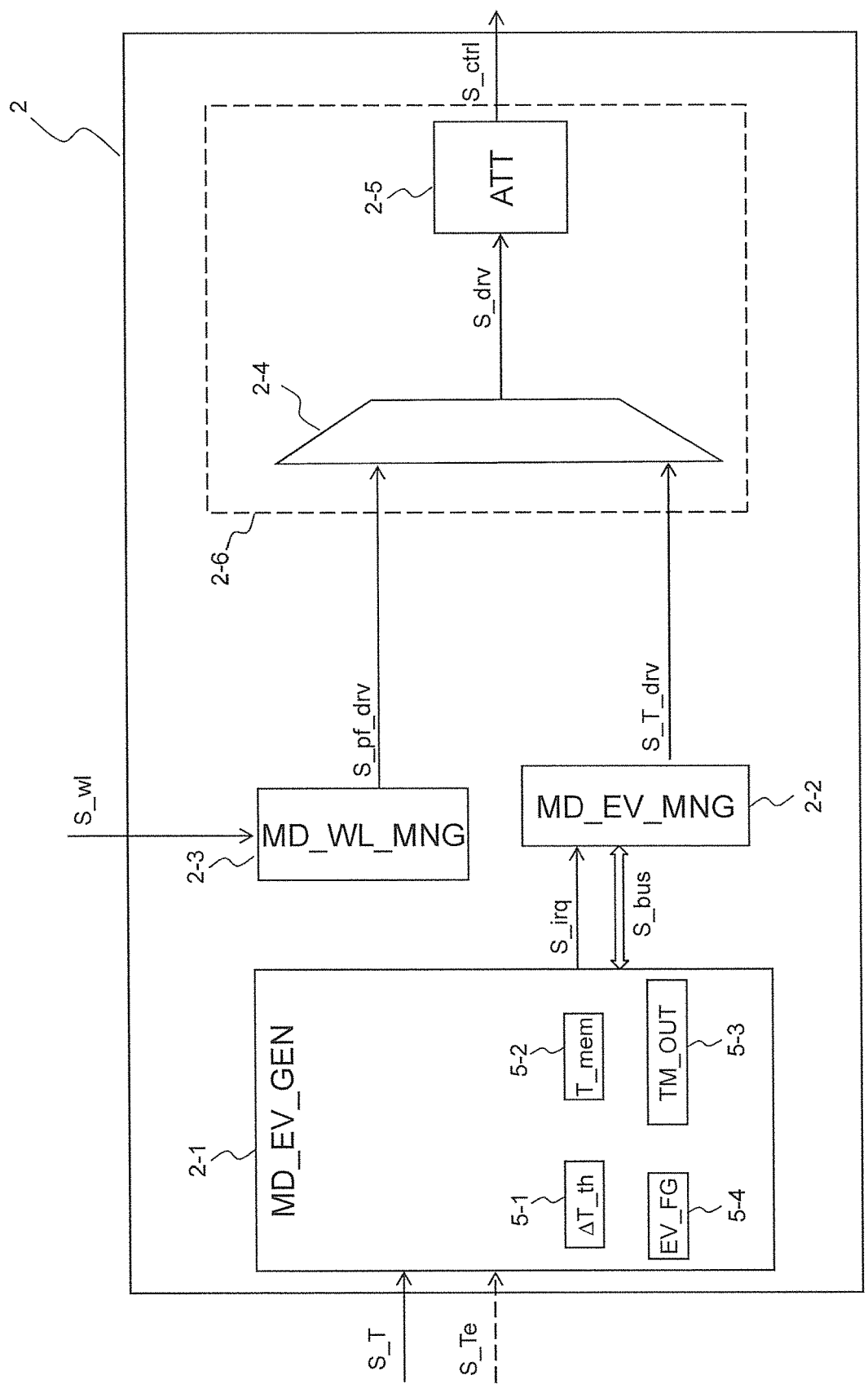
FIG. 2 is a block diagram of an electronic device to control temperature and computing performance, used in the control system of FIG. 1.

With reference to FIG. 2, it shows the block diagram of the electronic control device 2.

The electronic control device 2 comprises:

an event generation module 2-1;

an event management module 2-2;

a computational load management module 2-3;

an operating module 2-6.

The operating module 2-6 in turn comprises a selection module 2-4 and an actuator 2-5.

The event generation module 2-1 and the event management module 2-2 are connected to each other, for example by means of suitable electrical signals and/or buses, as shall be explained in further detail below.

The event generation module 2-1 has the function of generating the events of the event-based thermal control scheme.

More specifically, the event generation module 2-1 is configured to receive the internal temperature signal S_Ti as input and to generate as output an event signal S_irq representative of a control event indicating if it is necessary to recalculate the value of the control signal S_ctrl generated by the electronic control device 2, as a function of particular conditions that shall be explained in further detail below.

For example, the event signal S_irq is a logic signal having a high logic value to indicate the need to recalculate the value of the control signal S_ctrl and having a low logic value to indicate that there is no need to recalculate the value of the control signal S_ctrl.

The event generation module 2-1 can be implemented in hardware or in software, as a function of the value of the time constant of the thermal dynamics of the processing unit 3.

Advantageously, a hardware implementation of the event generation module 2-1 allows to detect fast thermal dynamics, that is with time constants of the order of several milliseconds, which occur for example in integrated circuits with a three-dimensional layout: in this case said hardware implementation allows to obtain a reaction time comprised between 200 microseconds and 500 microseconds, which is thus sufficient to react in time to said thermal dynamics of the order of milliseconds.

In one embodiment the processing unit 3 is a microprocessor and the event signal S_irq is an interrupt signal generated asynchronously by the event generation module 2-1 of a hardware type and subsequently received by the microprocessor 3; in this case, the interrupt signal S_irq is a logic signal having a high logic value to indicate the need to recalculate the value of the control signal S_ctrl and having a low logic value to indicate that there is no need to recalculate the value of the control signal S_ctrl.

Moreover, the event generation module 2-1 is electrically connected to the event management module 2-2 by means of a bus 12 carrying a bus signal S_b.

The event management module 2-2 has the function of calculating a control action with an event-based technique.

In particular, the control action is such that the processing unit 3 fulfills a maximum temperature constraint at which the processing unit 3 can operate, as shall be explained in further detail below.

The term "maximum temperature" (with reference to the processing unit 3) is understood as the maximum temperature value associated with the processing unit 3 above which there is a high risk of damaging the operation of the processing unit 3 or there is a high risk of reducing the duration of the useful life of the processing unit 3.

In particular, the event management module 2-2 is configured to receive as input the event signal S_irq and to generate therefrom a first candidate driving signal S_T_drv for driving the actuator 2-5, as shall be explained in further detail below.

The event management module 2-2 is a digital controller, for example of a PID type (that is with a proportional-integral-derivative action), or of a PI type (that is with a proportional-integral action).

The computational load management module 2-3 has the function of calculating, as a function of the value of the computational load signal S_wl, a computing performance parameter of the processing unit 3 and of generating as output a second candidate driving signal S_pf_drv carrying the value of said computing performance parameter.

In particular, the value of the computing performance parameter is changed according to the following criteria:
the value of the computing performance parameter is decreased, in case wherein the value of the computational load (carried by the computational load signal S_wl) is decreased, so as to reduce the power consumption of the processing unit 3 when the latter is processing a small amount of data;
the value of the computing performance parameter is increased, in case wherein the value of the computational load is increased, so as to succeed in meeting the demands of the processing unit 3 when the latter is processing a large amount of data.

For example, the computational load signal S_wl is the percentage of time (referring to a defined time interval) during which the processing unit 3 is active and the computing performance parameter is the value of the frequency (or period) of the clock signal based on which the processing unit 3 operates synchronously.

The selection module 2-4 is electrically connected to the computational load management module 2-3 and to the event management module 2-2 and it is such to generate as output a driving signal S_drv for driving the actuator 2-5.

The selection module 2-4 can be implemented in software or in hardware.

More specifically, the selection module 2-4 comprises two inputs for receiving the first candidate driving signal S_T_drv and the second candidate driving signal S_pf_drv, respectively, and it comprises an output for generating the driving signal S_drv selected from the first candidate driving signal S_T_drv and the second candidate driving signal S_pf_drv.

The set of the event detection module 2-1, of the event management module 2-2, of the computational load management module 2-3 and of the selection module 2-4 has the function of implementing a combined "override" type of control of the temperature and computing performance of the processing unit 3, so that the processing unit 3 operates at the computing performance level required to meet the demands of the current computational load, while at the same time fulfilling the constraint concerning the maximum temperature at which the processing unit 3 can operate.

The purpose of the operating module 2-6 is to drive the actuator 2-5 (or two or more actuators) according to an override control rule so that the processing unit 3 operates at the suitable performance level but below the temperature constraints, which the first candidate driving signal S_T_drv is assigned to fulfill.

In particular, if no second candidate driving signal S_pf_drv is present, it is understood that the only constraint to be fulfilled is the temperature constraint and thus the driving signal S_drv sent to the actuator 2-5 will depend solely on the first candidate driving signal S_T_drv.

If instead the performance level must also depend on the measured load, the second candidate driving signal S_pf_drv will carry the relative information; in this case, the processing unit 3 will operate at the performance level required by the second candidate driving signal S_pf_drv if the first candidate driving signal S_T_drv allows it, in that the processing unit 3 will not risk overheating, that is the driving signal S_drv sent to the actuator 2-5 will depend solely on the second candidate driving signal S_pf_drv. Otherwise, the first candidate driving signal S_T_drv will prevail instead, that is the driving signal S_drv sent to the actuator 2-5 will depend solely on the first candidate driving signal S_T_drv.

In one embodiment the values of the first candidate driving signal S_T_drv and of the second candidate driving signal S_pf_drv are the period of respective substantially periodic clock signals; in this case the driving signal S_drv selected according to the override control rule is equal to the greatest value between the value of the period of the first candidate driving signal S_T_drv and the value of the period of the second candidate driving signal S_pf_drv.

The actuator 2-5 is connected to the selection and processing module 2-4 and has the function of generating as output the control signal S_ctrl, as a function of the value of the input driving signal S_drv.

In one embodiment the actuator 2-5 is a digital controlled oscillator (abbreviated as DCO), the driving signal S_drv is a digital signal and the control signal S_ctrl is a clock signal having a variable frequency value, as a function of the value of the input voltage signal S_drv.

Alternatively, the actuator 2-5 is configured to dynamically change the value of the supply voltage and of the operating frequency of the synchronous circuits implementing the processing unit 3: in this case the driving signal S_drv is a voltage signal and the control signal S_ctrl is a signal for configuring the value of the supply voltage and of the operating frequency of the clock signal of the processing unit 3.

Advantageously, according to a first variant of the disclosure the event generation module 2-1 is configured to generate the event signal S_irq according to a "send-on-delta" type of activation rule, in combination with the comparison with respect to a time value indicated hereinafter as timeout TM_OUT.

In this case the event generation module 2-1 is such to generate two types of events:
a temperature threshold event;
a timeout event.

The temperature threshold event is generated if the current value of the internal temperature signal S_Ti differs from a stored internal temperature valve T_mem by a value greater than or equal to the value of a variation in the threshold temperature $\Delta T\_th$, wherein the stored internal temperature value T_mem is the value of the internal temperature signal S_Ti at the time when the previous temperature threshold or timeout event occurred.

As a result, it is used a temperature threshold which is variable, that is it changes each time a temperature event is generated so that it is relative to the temperature measured when the last temperature event occurred.

The use of a variable temperature threshold allows to reduce the reaction time of the thermal control scheme.

Differently, accordance to the prior art it is used a fixed temperature threshold (e.g. equal to 85° C.): this could require a reaction time that is too long, resulting in an excessive increase in the temperature of the processing unit and thus the risk of damaging it.

Said variable threshold can be chosen according to the following two criteria.

According to the first criterion, a variable symmetric threshold is used.

In this case, it is defined a temperature band centered around the current value of the temperature threshold, that is having a maximum temperature value equal to the sum of the current value of the temperature threshold and of a value of a variation in the threshold temperature $\Delta T\_th$ and having a minimum temperature value equal to the difference between the current value of the temperature threshold and the value of a variation in the threshold temperature $\Delta T\_th$.

As a result, the event generation module 2-1 is such to generate temperature events both in case wherein it is detected that the current value of the temperature of the processing unit 3 is greater than the maximum value of the current temperature and in case wherein the value of the current temperature of the processing unit 3 is lower than the minimum value of the current temperature.

The use of the variable symmetric threshold is illustrated below in the description of FIG. 6A.

According to the second criterion, a variable asymmetric threshold is used.

In this case it is defined a temperature band having a maximum temperature value equal to the sum of the current value of the temperature threshold and of a value of a variation in the threshold temperature $\Delta T\_th$, and infinitely extended towards the low temperature values.

The use of a variable asymmetric threshold allows to reduce the number of temperature threshold events generated by the event generation module 2-1, in case wherein the temperature trend of the processing unit 3 is decreasing (for example because the computational load of the processing unit 3 has decreased).

In fact, in this case it is possible to avoid the generation of temperature events, because the internal temperature of the processing unit 3 is decreasing and thus there is no risk of damaging the processing unit 3.

The use of the variable asymmetric threshold is illustrated below in the description of FIG. 6B.

The timeout event is generated in case wherein the value of the time interval comprised between the current time and the time at which the previous event (temperature threshold or timeout event) occurred is equal to the timeout value TM_OUT.

Therefore, in spite of the fact that the temperature of the processing unit 3 is within the current temperature band (symmetric or asymmetric), a timeout event is still generated in case wherein a time interval equal to the timeout value TM_OUT is elapsed.

The generation of the timeout event has the function of ensuring a minimum control frequency, for example for diagnostic purposes.

According to said first variant of the disclosure, the event generation module 2-1 comprises a memory for storing the following values:
the value of the variation of the threshold temperature $\Delta T\_th$ indicating the value of a maximum variation of the temperature associated with the processing unit 3 with respect to the current value of the temperature threshold;
the value of the stored internal temperature T_mem indicating the value of the temperature (associated with the processing unit 3) at the time wherein a temperature threshold event or a timeout event is generated by the event generation module 2-1;
the timeout value TM_OUT indicating the time interval following which a timeout event is generated by the event generation module 2-1;
an event flag EV_FG having a value indicating if the last event generated was a temperature threshold event or a timeout event.

In particular, in the first variant of the disclosure the internal temperature signal S_Ti is sampled (inside the event generation module 2-1) at a defined sampling interval Ts (e.g. comprised between 200 microseconds and 500 microseconds), generating the current value of the temperature associated with the processing unit 3.

In principle, anyway, the generation of temperature events can also be implemented using analog technology.

Subsequently, it is verified if the current value of the sampled internal temperature signal S_Ti differs from the stored internal temperature value T_mem by a value greater than or equal to the value of the variation in the threshold temperature $\Delta T\_th$:
in the negative case (that is S_Ti-T_mem<$\Delta T\_th$), it is generated the event signal S_irq having a value indicating the absence of the temperature threshold event;
in the positive case (that is S_Ti-T_mem$\geq \Delta T\_th$), it is generated the event signal S_irq i having a value indicating the presence of the temperature threshold event, the event flag EV_FG is assigned to the value indicating the presence of the temperature threshold event and the event generation module 2-1 is activated again.

Moreover, it is calculated and checked if the value of the time interval between the current sampling time and the time wherein the previous event (temperature threshold or timeout event) occurred is equal to the stored timeout value TM_OUT:
in the negative case, it is necessary to wait for the next value of the sampled internal temperature signal S_Ti;
in the positive case, the event flag EV_FG is assigned to the value indicating the presence of the timeout event, it is forced the activation of the event generation module 2-1 and it is repeated the above indicated verification of the current value of the sampled internal temperature signal S_Ti.

Advantageously, according to a second variant of the disclosure, the event management module 2-2 of the first variant is further configured to calculate and dynamically vary the timeout value TM_OUT, so as to reach a tradeoff between the need to obtain good quality temperature control and a reduced amount of computing required to implement the control scheme.

In this case, the event management module 2-1 is further configured to generate, on the bus 12, the bus signal S_b carrying the updated timeout value TM_OUT; moreover, the event generation module 2-1 is further configured to read, from the bus 12, the bus signal S_bus having the updated timeout value TM_OUT and to write said value into the register 5-3.

In particular:
the timeout value TM_OUT is increased in case wherein the last event generated by the event detection module 2-1 was a timeout event, possibly reaching a maximum timeout value TM_max;
the timeout value TM_OUT is brought back equal to a minimum timeout value TM_min, in case wherein the last event generated by the event detection module 2-1 was a temperature threshold event.

For example, in case of a hardware implementation of the event detection module 2-1, the timeout value TM_OUT is increased up to a maximum value equal to 0.5 seconds.

Figure 4:
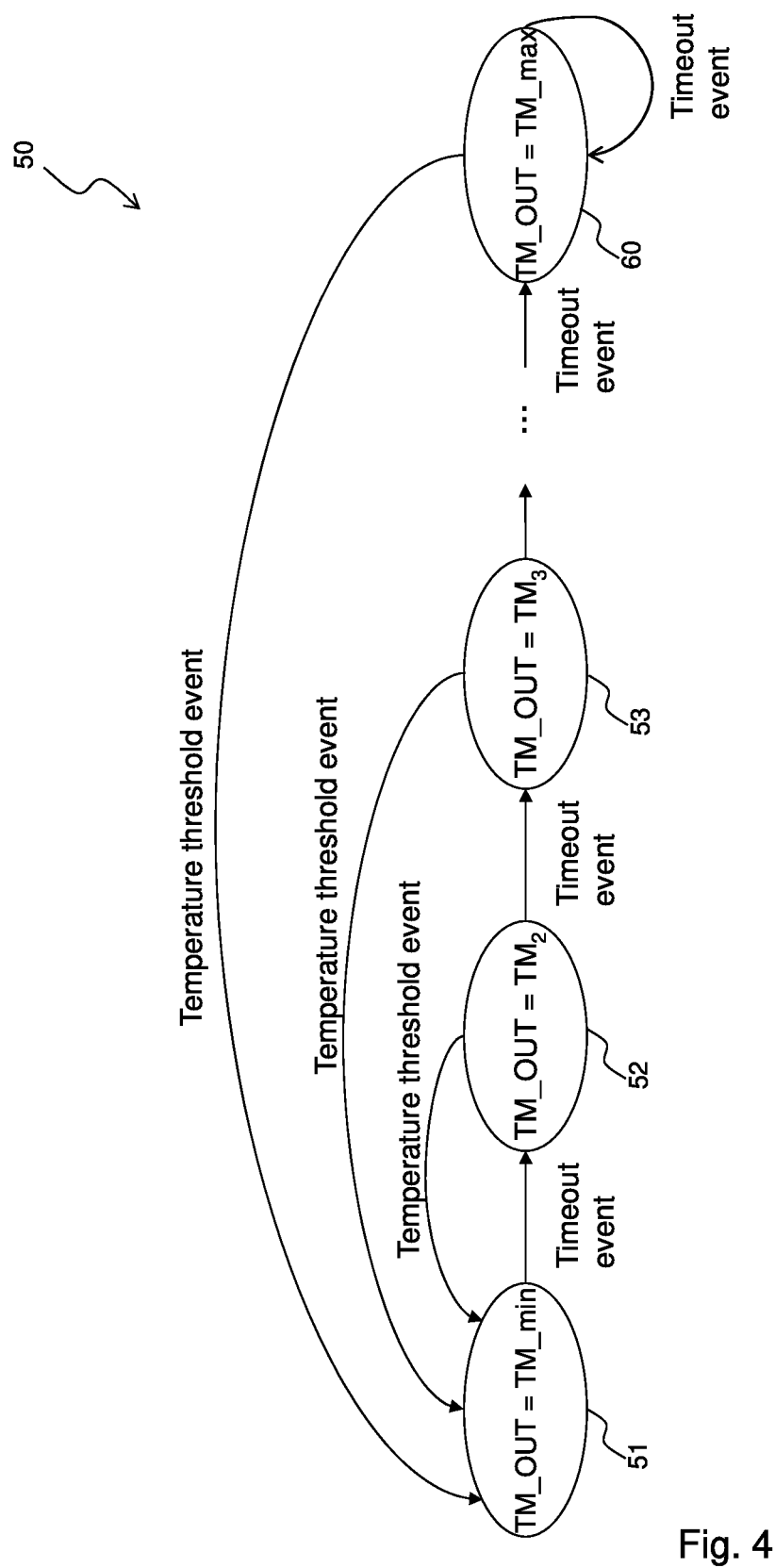
FIG. 4 represents a possible state diagram of a finite state machine that implements the event generation module according to a variant of an embodiment of the disclosure.

FIG. 4 represents the state diagram 50 of a finite state machine implementing the event management module 2-2 of the second variant of the disclosure.

The diagram 50 starts with the initial state 51 wherein the timeout value TM_OUT is assigned as equal to the minimum timeout value TM_min.

There is a transition from the initial state 51 to state 52 in case wherein a timeout event occurs, that is the event management module 2-2 receives from the event generation module 2-1 the event signal S_irq indicating the presence of a control event and reads, from the bus 12, the event flag EV_FG indicating the presence of a timeout event.

In state 52 the timeout value TM_OUT is assigned as equal to value $TM_2$ greater than the minimum timeout value TM_min and thus the event management module 2-2 generates, on the bus 12, the value $TM_2$, which is written into the register 5-3 of the event generation module 2-1.

From state 52, there are two possibilities:
a transition from state 52 to state 53, in case wherein a timeout event occurs;
there is a return from state 52 to the initial state 51 in case wherein a temperature threshold event occurs, that is the event management module 2-2 receives from the event detection module 2-1 the event signal S_irq indicating the presence of a control event and reads, from the bus 12, the event flag EV_FG indicating the presence of a temperature threshold event.

In state 53, the timeout value TM_OUT is assigned as equal to the value $TM_3$ greater than the value $TM_2$.

In state 53 the behaviour is similar to that explained previously for state 52, that is the process proceeds to a subsequent state for increasing the timeout value TM_OUT in case wherein a timeout event occurs, whereas it returns to the initial state 51 in case wherein a temperature threshold event occurs.

The increase in the timeout value TM_OUT can continue until reaching the maximum timeout value TM_max in state 60, in case wherein only timeout events occur; otherwise, in the intermediate states comprised between 53 and 60 there is a return to the initial state 51, in case wherein a temperature threshold event occurs.

In state 60, the timeout value TM_OUT is equal to the maximum timeout value TM_max, and thus in case wherein a timeout event occurs, the process remains in state 60.

Otherwise, from state 60 there is a return to the initial state 51, in case wherein a temperature threshold event occurs.

Figure 5:
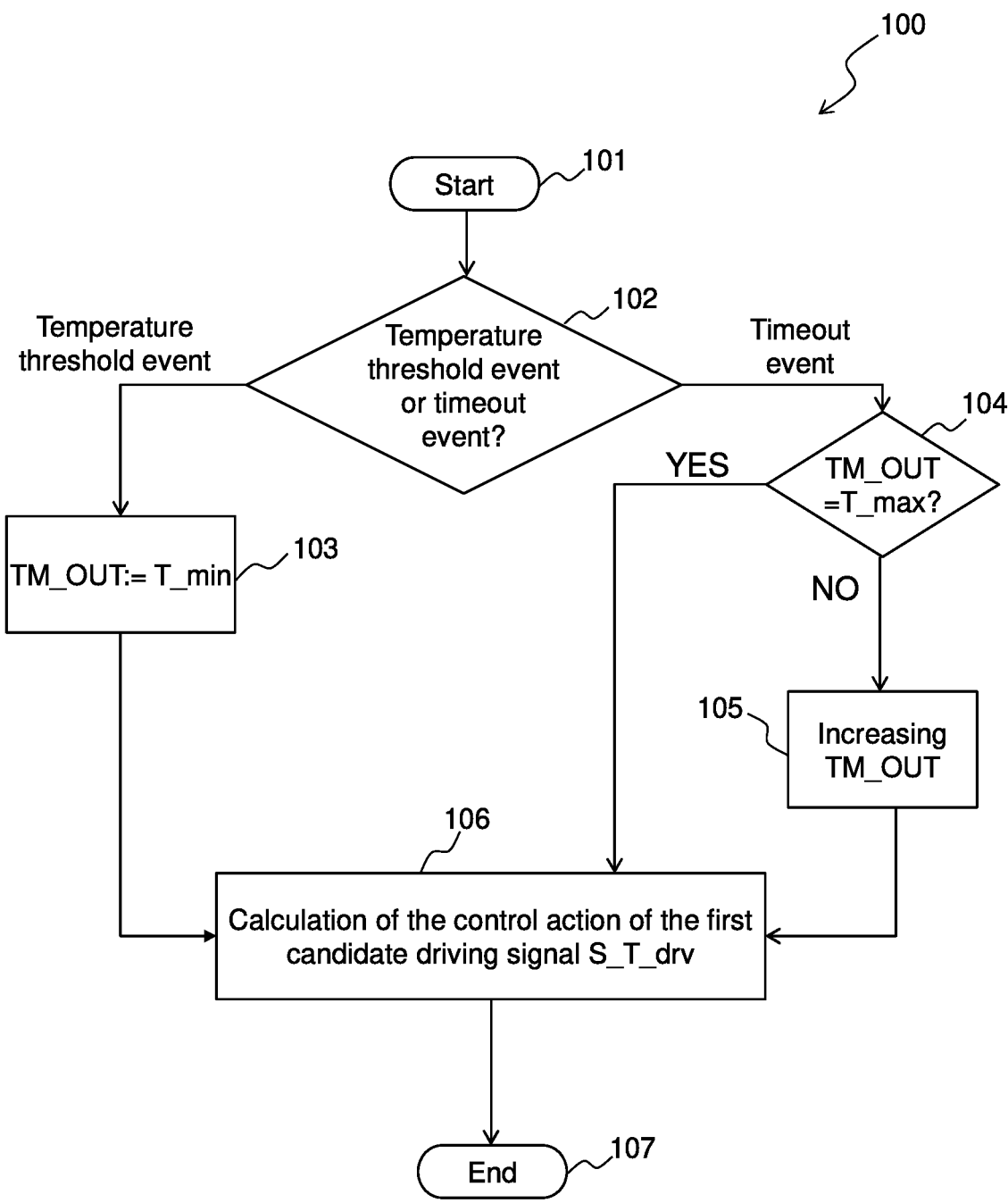
FIG. 5 is a flow diagram of a method for controlling the temperature of a processing unit according to the variant of the disclosure.

With reference to FIG. 5, it shows the flow diagram 100 of the method for controlling the temperature of the processing unit 3 according to the second variant of the disclosure.

The flow diagram 100 is executed in the event management module 2-2.

The flow diagram 100 starts with step 101.

Step 101 is followed by step 102, wherein it is verified if a temperature threshold event or a timeout event has been detected:
in case wherein a temperature threshold event is detected, the method continues to step 103;
in case wherein a temperature timeout event is detected, the method continues with step 104.

In step 103 the timeout value TM_OUT is assigned as equal to the minimum timeout value TM_min and the method continues with step 106.

In step 106 it is calculated the control action of the first candidate driving signal S_T_drv, for example by means of a digital controller of the PID type.

Step 106 is followed by step 107 wherein the flow diagram 100 terminates.

In step 104 it is verified if the timeout value TM_OUT is equal to the maximum timeout value TM_max:
in the negative case (that is TM_OUT<TM_max), the method continues with step 105;
in the positive case (that is TM_OUT>TM_max), the method continues to step 106.

In step 105 the timeout value TM_OUT is increased.

The use of a variable timeout value TM_OUT is illustrated below also in the description of FIGS. 6A-6B.

Figure 3:
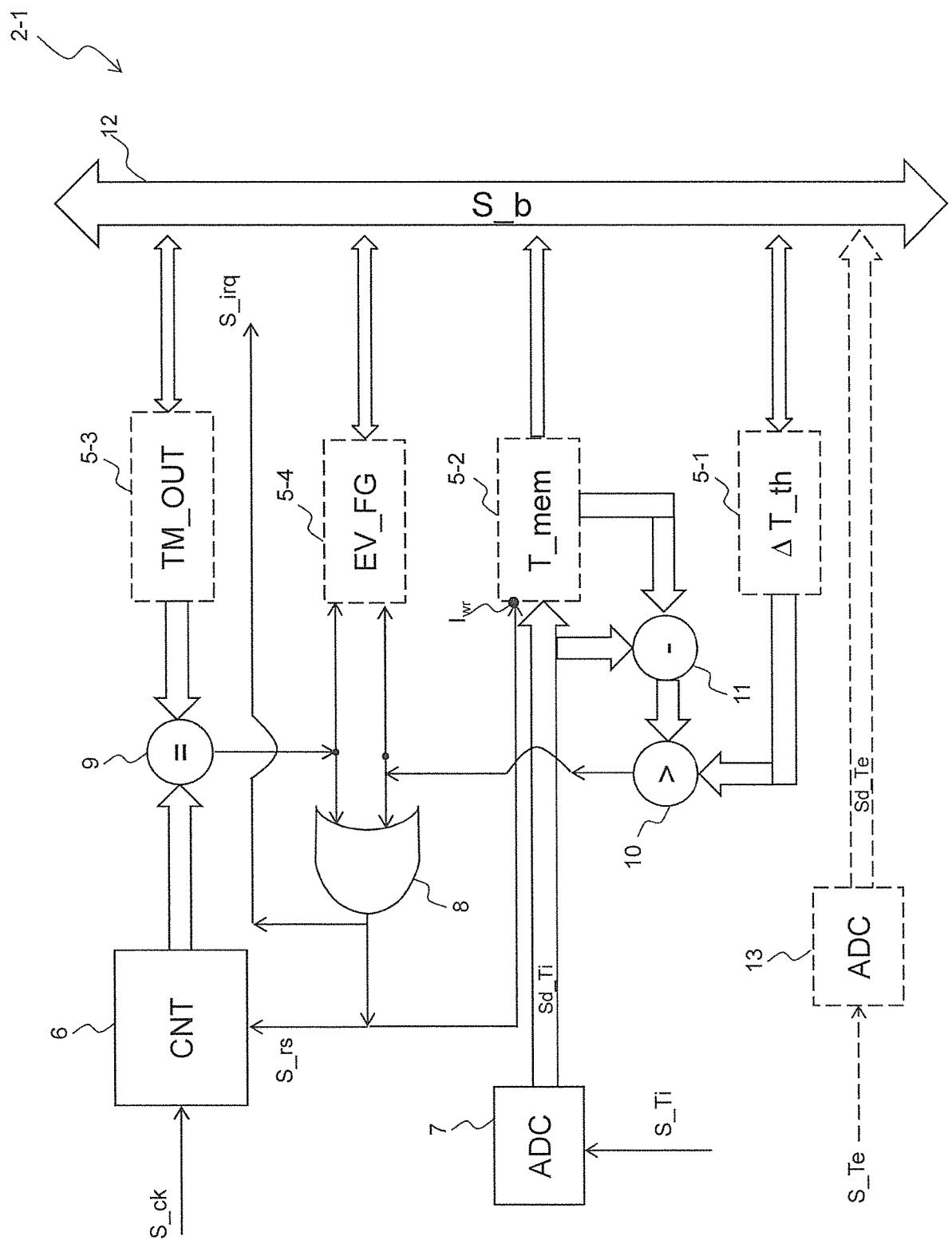
FIG. 3 illustrates in further detail a possible hardware implementation of an event generation module inside the electronic control device of FIG. 2.

Advantageously, according to a third variant of the disclosure, the event generation module 2-1 of a hardware type implements the variable asymmetric threshold and it is implemented with the logic circuits shown in FIG. 3.

In particular, the event generation module 2-1 comprises:
four registers 5-1, 5-2, 5-3, 5-4 for storing the threshold temperature variation value ΔT_th, the stored internal temperature value T_mem, the timeout value TM_OUT and the event flag value EV_FG, respectively;
an analog-to-digital converter 7;
a counter 6;
a logic gate 8 of the OR type;
an equality comparator 9;
a magnitude comparator 10;
a subtractor circuit 11.

The analog-to-digital converter 7 has the function of receiving the internal temperature signal Sd_Ti of an analog type and of performing the conversion of the internal temperature signal Sd_Ti of an analog type into an internal temperature signal Sd_Ti of a digital type; moreover, the sampled value of the digital internal temperature signal Sd_Ti is stored into the register 5-2 when a temperature threshold event or timeout event occurs.

The counter 6 has the function of calculating the time interval comprised between the current sampling time and the time wherein the previous event occurred (temperature threshold or timeout event).

In particular, the counter 6 comprises a first input terminal adapted to receive the system clock signal S_ck and an N-bit output terminal for generating, as a function of the value of the system clock signal S_ck, the counting value ΔT_cnt indicating the time interval between the current sampling time and the time wherein the previous event occurred.

The counter 6 further comprises a second input terminal adapted to receive a reset signal S_rs for resetting the counting value ΔT_cnt generated by the counter 6.

The equality comparator 9 has the function of checking if the counting value ΔT_cnt is equal to the timeout value TM_OUT stored into the register 5-3, generating as output a high logic value indicating the presence of a timeout event and storing into the register 5-4 the event flag EV_FG indicating the timeout event.

The subtractor circuit 11 has the function of performing the subtraction between the current value of the digital internal temperature signal Sd_Ti and the stored internal temperature value T_mem.

The magnitude comparator 10 has the function of checking if the value of said subtraction is greater than the threshold temperature variation value ΔT_th, generating as output a high logic value indicating the presence of a temperature threshold event in case wherein said check proves to be positive and storing into the register 5-4 the event flag EV_FG indicating the temperature threshold event.

The logic gate 8 is of an OR type and it has the function of generating as output a high logic value, in case wherein a temperature threshold event (a high logic value of the comparator 10) or a timeout event (a high logic value of the equality comparator 9) occurs, wherein said output of the OR gate 8 constitutes the event signal S_irq.

Furthermore, the output signal of the logic gate 8 has the function of enabling the register 5-2 so as to store therein the digital value of the internal temperature Sd_Ti when a temperature threshold event or a timeout event occurs.

Advantageously, according to a fourth variant of the disclosure, the event detection module 2-1 is implemented with the hardware structure of the state machine of the third variant and the event management module 2-2 is implemented with a software program.

The software program of the event management module 2-2 can be implemented by means of an Interrupt Service Routine (ISR) at the level of the Operating System by means of an SMI Interrupt at the EFI/BIOS level (in this regard, see the document "*Intel Platform Innovation Framework for EFI System Management Mode Core Interface Specification*", which is downloadable from the website: www.intel.comcontent/dam/www/public/us/en/documents/reference-guides/efi-smn-cis-v09.pdf).

The programming language used for the software program of the event management module 2-2 is for example C/C++.

The use of a software program for implementing the event management module 2-2 allows to have flexibility and to finely calibrate the control algorithm to the particular application.

Figure 6A:
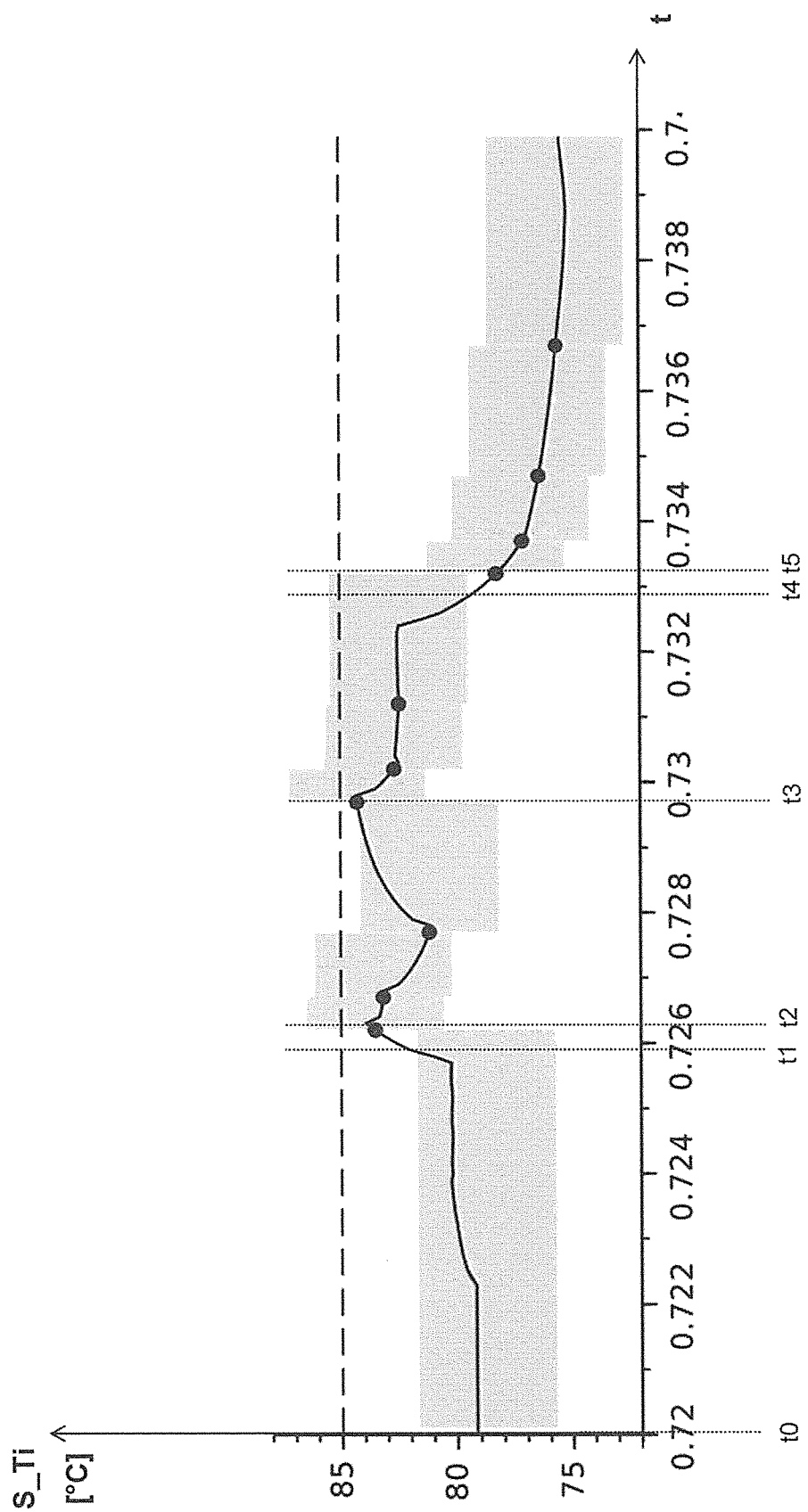
FIG. 6A shows a first possible trend over time of the internal temperature of a processing unit controlled by the electronic control device according to the variant of the disclosure.

FIG. 6A shows a first possible trend over time of the internal temperature signal S_Ti of the processing unit 3 controlled by the electronic control device 2 according to the first and the second variant of the disclosure, in the case of the use of a variable symmetric temperature threshold.

It is possible to observe the presence of a temperature band representing the range of values of the internal temperature signal S_Ti differing, with respect to the stored temperature value of the internal temperature signal S_Ti corresponding to the last time that a temperature threshold event or timeout event was generated, by a (positive or negative) value lower than the threshold temperature variation value ΔT_th.

It can be observed that there is a first time interval comprised between t0 and t1 wherein the values of the internal temperature signal S_Ti are within said temperature band, which proves to be centered around the value equal to about 79° C.

At time t1 (subsequent to t0), the value of the internal temperature signal S_Ti exceeds the current higher value of the temperature band and at time t2 the electronic control device 2 is activated.

In particular, at time t2 the event generation module 2-1 generates a temperature threshold event and thus the event management module 2-2 generates the control signal S_ctrl having a suitable value such to reduce the computational load of the processing unit 3 (and thus such to reduce the internal temperature of the processing unit 3); moreover, the temperature band is centered on the value of the internal temperature signal S_Ti measured when the generation of the temperature threshold event occurred at time t2 and the timeout value TM_OUT is assigned as equal to the minimum timeout value TM_min.

At the times comprised between t2 and t3 (excluding t3), the values of the internal temperature signal S_Ti are again within said temperature band, which is now centered around the value equal to about 83° C.; during said interval the event generation module 2-1 generates two timeout events and the timeout value TM_OUT is gradually increased.

It can be observed that at the times comprised between t2 and t3 (excluding t3) the internal temperature signal S_Ti first has a decreasing trend and then an increasing trend; moreover, it can be observed that each time the event generation module 2-1 generates a timeout event, the temperature band shifts so as to be centered on the value of the internal temperature signal S_Ti detected when the event generation module 2-1 generated the last timeout event.

At the time t3 (subsequent to t2) the value of the internal temperature signal S_Ti moves for the second time beyond the current higher value of the temperature band and the electronic control device 2 is activated again; the event generation module 2-1 thus generates a temperature threshold event and thus the event management module 2-2 generates the control signal S_ctrl having a suitable value such to reduce the computational load of the processing unit 3 (and thus such to reduce the internal temperature of the processing unit 3).

The temperature band is centered on the value of the internal temperature signal S_Ti measured when the generation of the temperature threshold event occurred at time t3 and the timeout value TM_OUT is again assigned as equal to the minimum timeout value TM_min.

At the times comprised between t3 and t4 (excluding t4) the values of the internal temperature signal S_Ti are again within the current temperature band; during said interval the event generation module 2-1 generates two timeout events and the timeout value TM_OUT is again gradually increased.

It can be observed that at the times comprised between t3 and t4 (excluding t4) the internal temperature signal S_Ti first has a substantially constant trend and then a decreasing trend; moreover, it can be observed that each time the event generation module 2-1 generates a timeout event, the temperature band shifts so as to be centered on the value of the internal temperature signal S_Ti detected when the event generation module 2-1 generated the last timeout event.

At time t4 (subsequent to t3) the value of the internal temperature signal S_Ti is beyond the lower value of the temperature band and at time t5 the electronic control device 2 is activated again, in a manner similar to that explained above for times t2 and t3.

In particular, at time t5 the temperature band is centered on the value of the internal temperature signal S_Ti measured when the generation of the temperature threshold event occurred at time t5 and the timeout value TM_OUT is again assigned as equal to the minimum timeout value TM_min.

At times subsequent to t5 the values of the internal temperature signal S_Ti are again within the current temperature band: the event generation module 2-1 generates further timeout events and the timeout value TM_OUT is again gradually increased.

Figure 6B:
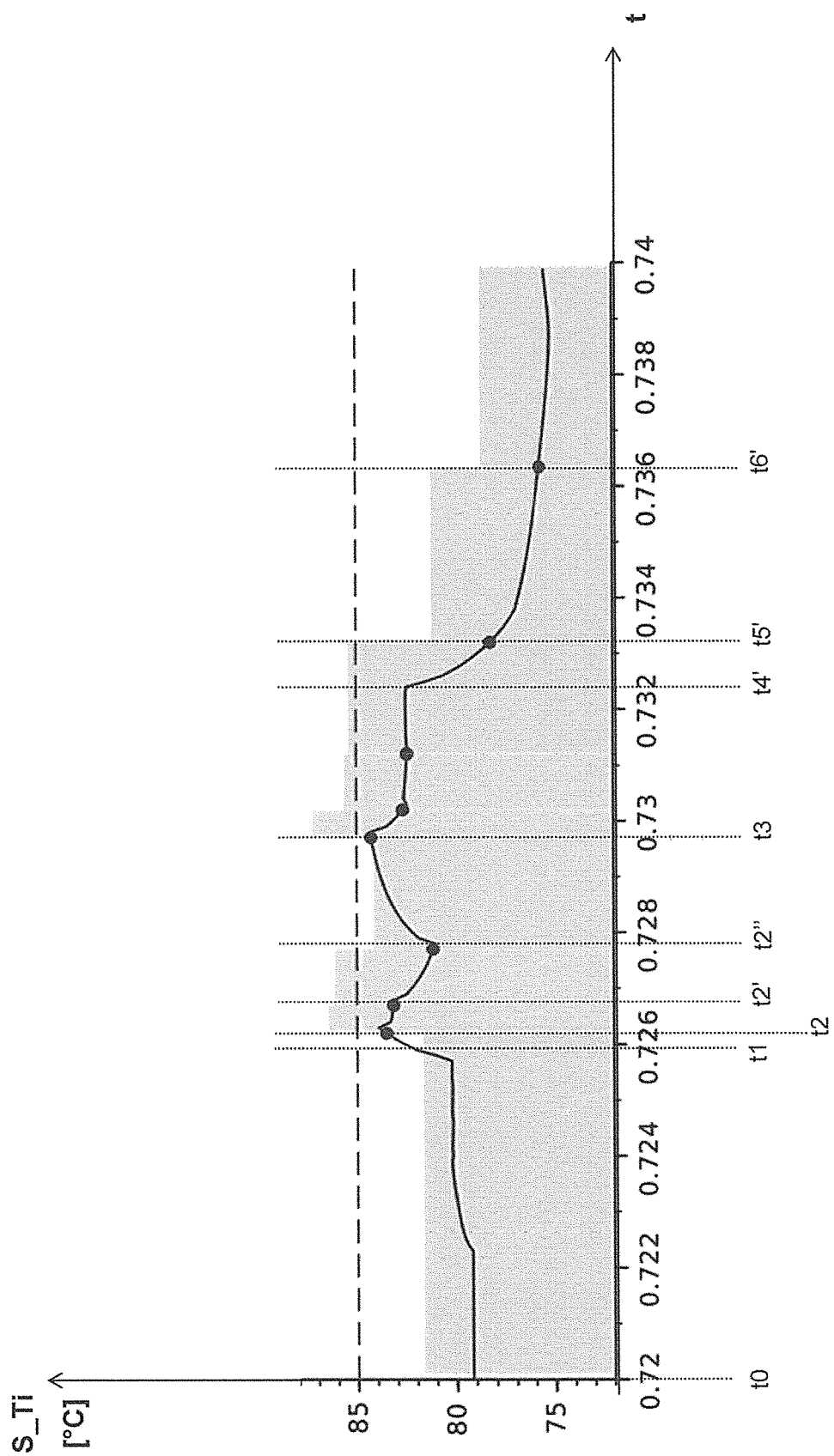
FIG. 6B shows a second possible trend over time of the internal temperature of a processing unit controlled by the electronic control device according to the variant of the disclosure.

FIG. 6B shows a second possible trend over time of the internal temperature signal S_Ti of the processing unit 3 controlled by the electronic control device 2 according to the second variant of the disclosure, in case of use of a variable asymmetric temperature threshold.

The internal temperature signal S_Ti of FIG. 6B differs from that of FIG. 6A in that a symmetric temperature band is not present; differently, when a temperature event occurs a new maximum temperature threshold value is set, equal to the sum of the temperature signal value S_Ti measured when the last temperature event occurred with the threshold temperature variation value ΔT_th.

Operation in FIG. 6B is the same as that illustrated previously for FIG. 6A up to time t4'.

At time t4' the value of the internal temperature signal S_Ti starts to show a decreasing trend, for example because the computational load of the processing unit 3 has decreased; unlike the operation shown in FIG. 6A, the event generation module 2-1 does not generate a temperature event, because the internal temperature of the processing unit 3 is decreasing and therefore there is no risk of damaging the processing unit 3.

As a result, the event generation module 2-1 generates timeout events, in particular at times t5' and t6', gradually increasing the timeout value TM_OUT.

The operation of the control system 1 shall now be described according to the first, second and third variants of the disclosure, with reference also to FIGS. 1, 2, 3, 5 and 6B.

For the purposes of explaining the operation thereof, the following assumptions are to be considered:
the processing unit 3 is a microprocessor of a desktop or laptop personal computer;
the event generation module 2-1 is implemented in hardware as shown in FIG. 3 and it generates the event signal S_irq, which is an interrupt having a high or low logic value;
the first candidate driving signal S_T_drv, the second candidate driving signal S_pf_drv, the driving signal S_drv are periodic clock signals having a variable frequency;
the actuator 2-5 is a DVFS actuator generating as output the control signal S_ctrl carrying variable supply voltage/ frequency values;
a threshold temperature variation value ΔT_th=3° C. has been configured into the register 5-1.

At the initial time t0 the register 5-2 of the event generation module stores a stored internal temperature value T_mem that is equal to 79° C. and the register 5-3 stores a timeout value TM_OUT that is greater than the interval of time comprised between t0 and t1.

At the times comprised between t0 and t1 (excluding t1) the internal temperature sensor 20 generates the internal temperature signal S_Ti, which has values that are lower than the value T_mem+ΔT_th=79+3=82° C. and thus the event generation module 2-1 does not generate any temperature threshold event.

Moreover, at the times comprised between t0 and t1 (excluding t1) the timeout value TM_OUT is greater than the value of the interval of time comprised between t0 an t1 and thus the event generation module 2-1 does not generate any timeout event.

As a result, at the times comprised between t0 and t1 (excluding t1) the event generation module 2-1 generates the interrupt signal S_irq having a low logic value indicating that no temperature threshold event or timeout event is present.

The computational load management module 2-3 generates the second candidate driving signal S_pf_drv, which is a clock signal having frequency values comprised between two limits $f_1$ and $f_2 > f_1$ that are characteristic of the processing unit 3 (for example $f_1$ is equal to 800 Mhz and $f_2$ is equal to 3 Ghz).

At the times comprised between t0 and t1 (excluding t1) the selection module 2-4 generates as output the driving signal S_drv equal to the second candidate driving signal S_pf_drv, which is a clock signal having frequency values comprised between $f_1$ and $f_2$.

The DVFS 2-5 receives as input the clock signal S_drv having frequency values comprised between $f_1$ and $f_2$ and it generates as output the control signal S_ctrl carrying a supply voltage value $VCC_1$ (e.g. equal to 1.1 V) and a clock signal having a frequency $f_3$ having values comprised between $f_1$ and $f_2$ (e.g. $f_3$=2.5 GHz).

The microprocessor 3 is thus supplied with the supply voltage value $VCC_1$ and operates based on the clock signal having a frequency $f_3$.

Therefore at the times comprised between t0 and t1 (excluding t1) the microprocessor 3 operates with the computing performance required by the computational load, because the values representative of the temperature of the microprocessor 3 are not critical and thus there is no risk of damaging it.

At time t1 (following t0) the internal temperature sensor 20 generates the internal temperature signal S_Ti having a value T1 that differs by more than 3° C. from the stored value T_mem=79° C. (e.g. T1=82.5° C.).

Therefore at time t2 (that is, the first sampling time of the sensor following t1), the event generation module 2-1 generates a temperature threshold event and thus it generates the interrupt signal S_irq having a transition from the low to high logic value indicating that a temperature threshold event is present.

Moreover, at time t2:
a high logic value is stored into the register 5-4 so as to indicate that the temperature threshold event has occurred;

the register 5-2 is updated, storing therein the digital value Sd_Ti=T2 of the internal temperature signal S_Ti at time t2, thus T_mem=T2 (for example T2=83° C.);

the timeout value TM_OUT equal to the minimum timeout value TM_min is stored into the register 5-3.

The event management module 2-2 performs the steps 102, 103 and 106 of the flow diagram 100 and generates as output the first candidate driving signal S_T_drv, which is a clock signal having a frequency value $f_4$ lower than $f_3$ (for example $f_4$=2 GHz).

The selection module 2-4 generates as output the driving signal S_drv equal to the first candidate driving signal S_T_drv having a frequency $f_4$.

The DVFS 2-5 receives as input the clock signal S_drv having the frequency value $f_4$ and generates as output the control signal S_ctrl carrying a supply voltage value $VCC_2$ lower than $VCC_1$ (e.g. equal to 1.05 V) and a clock signal having a frequency equal to $f_4$.

The microprocessor 3 is thus supplied with the supply voltage value $VCC_2$ and operates based on the clock signal having a reduced frequency $f_4$.

Therefore, starting from time t2, the microprocessor 3 operates with reduced performance levels with respect to the levels required by the load, because the value representative of the temperature of the microprocessor 3 is critical and thus it needs to be slowed down so as to prevent the risk of damaging it or reducing the life cycle thereof.

At the times comprised between t2 and t2' (subsequent to t2), owing to the control action, the internal temperature signal S_Ti has a decreasing trend that allows to prevent the risk of damaging the microprocessor 3 or reducing the life cycle thereof.

At time t2' the internal temperature sensor 20 generates the internal temperature signal S_Ti having a value T2' that differs by less than 3° C. (higher) from the value T_mem=T2 (e.g. T2'=81.5° C.), thus the event generation module 2-1 does not generate any temperature threshold event.

At time t2', however, the time counter 6 of the event generation module 2-1 has reached the timeout value TM_OUT=TM_min: as a result, the event generation module 2-1 generates a timeout event and thus it generates the interrupt signal S_irq having a high logic value indicating that a timeout event is present.

Moreover, at time t2':

a low logic value is stored into the register 5-4 so as to indicate that the timeout event has occurred;

the register 5-2 is updated, storing therein the digital value Sd_Ti=T2' of the internal temperature signal S_Ti at time t2', thus T_mem=T2'.

Moreover, the timeout value TM_OUT is increased to the value TM2, that is in the state diagram 50 the transition from state 51 to 52 takes place.

The event management module 2-2 performs the steps 102, 104, 105 and 106 of the flow diagram 100 and generates as output the first candidate driving signal S_T_drv, which is a clock signal having a frequency value $f_5$, which for explanatory purposes is assumed to be lower than $f_4$ (for example $f_5$=1.8 GHz).

The selection module 2-4 generates as output the driving signal S_drv equal to the first candidate driving signal S_T_drv having a frequency $f_5$.

The DVFS 2-5 receives as input the clock signal S_drv having the frequency value f5 and generates as output the control signal S_ctrl carrying a supply voltage value $VCC_3$ lower than $VCC_2$ (e.g. equal to 1.02 V) and a clock signal having a frequency equal to $f_5$.

The microprocessor 3 is thus supplied with the reduced supply voltage value $VCC_3$ and operates based on the clock signal having a frequency $f_5$.

Therefore, at time t2' the microprocessor 3 continues to operate with reduced performance levels, in that the value representative of the temperature of the microprocessor 3 is still critical and thus it needs to be slowed down further so as to prevent the risk of damaging it or reducing the life cycle thereof.

Operation at time t2" is similar to that described previously for time t2', with the difference being that the selection module 2-4 generates as output the driving signal S_drv equal to the second candidate driving signal S_pf_drv having a frequency $f_6$ greater than $f_5$.

The DVFS 2-5 receives as input the clock signal S_drv having the frequency value $f_6$ and generates as output the control signal S_ctrl carrying a supply voltage value $VCC_4$ greater than $VCC_3$ (e.g. equal to 1.1 V) and a clock signal having a frequency equal to $f_6$.

Therefore at time t2" the microprocessor 3 operates with the computing performance required by the load, because the value representative of the temperature of the microprocessor 3 is not critical and thus there is no risk of damaging it.

At the times comprised between t2" and t3 (excluding t3), the internal temperature signal values S_Ti differ by less than 3° C. higher with respect to the stored value T_mem, thus the event generation module 2-1 does not generate any temperature threshold event and the selection module 2-4 continues to generate as output the driving signal S_drv equal to the second candidate driving signal S_pf_drv carrying a clock signal having values such to best meet the computational load required of the microprocessor 3.

As a result, at the times comprised between t2" and t3 the internal temperature signal S_Ti resumes an increasing trend.

At time t3 the internal temperature sensor 20 generates the internal temperature signal S_Ti having a value T1 that again differs by more than 3° C. higher with respect to the stored value T_mem and thus the event generation module 2-1 again generates a temperature threshold event.

Operation at time t3 is similar to that explained previously for time t2.

At the times comprised between t3 and t4' the event generation module 2-1 generates two timeout events and thus the timeout value TM_OUT is increased twice.

At time t4' the computational load of the microprocessor 3 decreases and thus the internal temperature signal S_Ti begins to show a decreasing trend.

At the times subsequent to time t4' the internal temperature signal S_Ti continues to show a decreasing trend and the event generation module 2-1 does not generate temperature threshold events, but it generates two timeout events at times t5' and t6', during which the timeout value TM_OUT is gradually increased.

Advantageously, according to a fifth variant of the disclosure the control system 1 further comprises a second external temperature sensor 21 having the function of detecting the temperature external to the processing unit 3.

The second external temperature sensor 21 is for example positioned on or near the heat sink.

In this case the electronic control device 2 further comprises a third input terminal $I_{2-3}$ adapted to receive the external temperature signal S_Te.

The use of a second temperature sensor 21 further allows to control the maximum thermal power dissipated by the processing unit 3 (in addition to the combined control of the maximum temperature and computational load of the processing unit 3).

Therefore the event generation module 2-1 is configured to further generate a thermal power event, in addition to the temperature threshold and timeout events illustrated previously.

Figure 7:
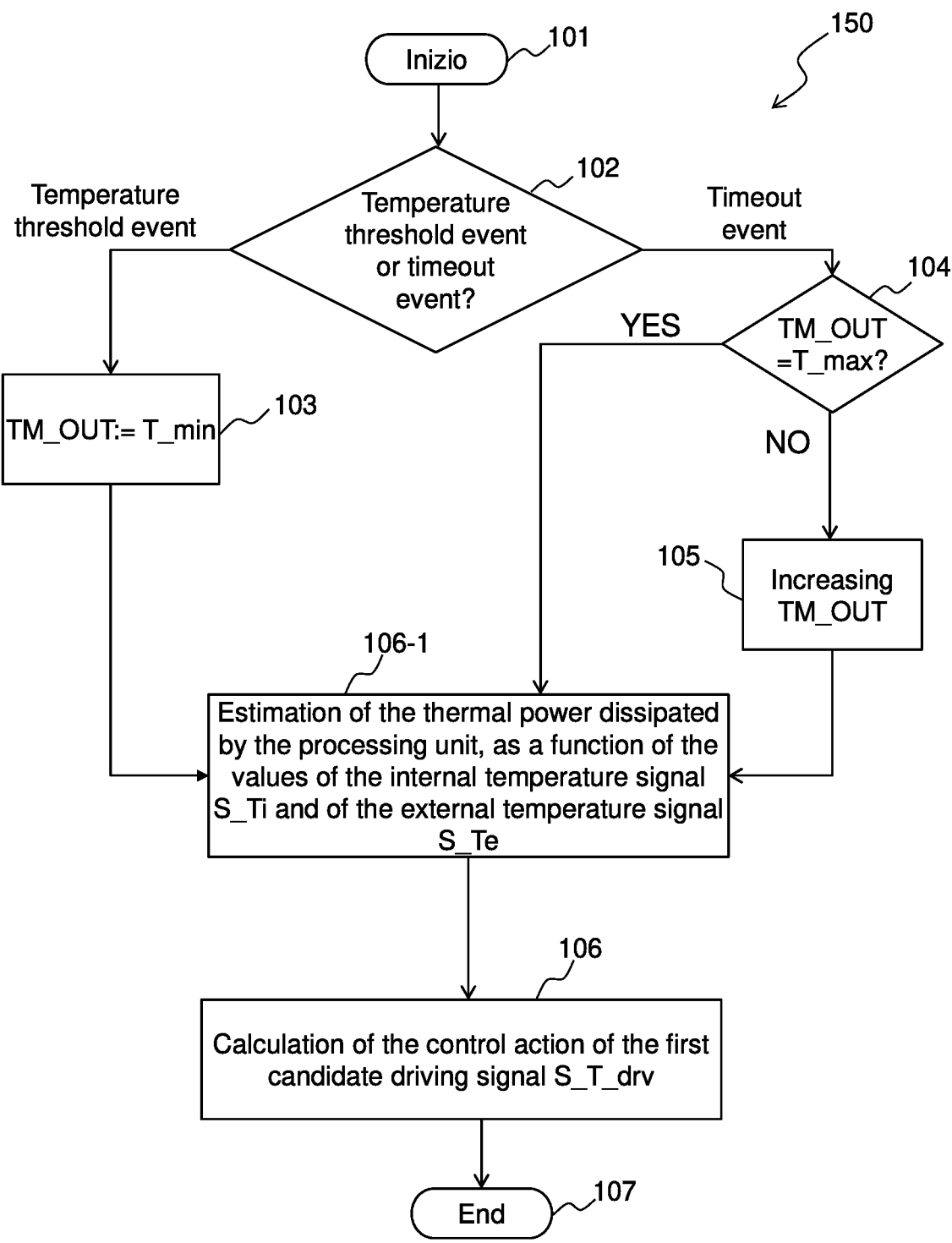
FIG. 7 is the flow diagram of a method for controlling the temperature of a processing unit according to another variant of the disclosure.

With reference to FIG. 7, it shows a flow diagram 150 of the method for controlling the temperature of the processing unit 3 according to the second and fifth variants of the disclosure.

The flow diagram 150 of FIG. 7 differs from the flow diagram 100 of the second variant of FIG. 5 in that an additional step 106-1 is inserted before step 106.

Therefore, step 103 is followed by step 106-1, step 104 is followed by step 106-1 in case wherein TM_OUT=T_max and step 105 is followed by step 106-1.

In step 106-1, an estimation is performed of the thermal power dissipated by the processing unit 3, as a function of the values of the internal temperature signal S_Ti and of the external temperature signal S_Te.

Step 106-1B is followed by step 106, wherein the control action is calculated, as explained previously.

In one embodiment said estimation of the thermal power dissipated by the processing unit 3 is calculated according to the formula G*(S_Te-S_Ti), wherein G is an estimation of the electrical conductance of the thermal path comprised between the position of the internal temperature sensor 20 and the position of the external temperature sensor 21.

According to a sixth variant of the disclosure, two or more electronic control devices 2-1, 2-2, 2-3, etc. are present, each of which being such to control the thermal power dissipated by two or more processing units 3-1, 3-2, 3-3, etc., respectively.

In other words, the first electronic control device 2-1 controls the first processing unit 3-1, the second electronic control device 2-2 controls the second processing unit 3-2, the third electronic control device 2-3 controls the third processing unit 3-3, and so forth.

In this case, for each electronic control device 2-1, 2-2, 2-3, etc., the previous considerations concerning the electronic control device 2 in its various embodiments as described above apply in a like manner.

In particular, each electronic control device 2-1, 2-2, 2-3, . . . controls the respective processing unit 3-1, 3-2, 3-3, . . . , using a distributed (that is, decentralized) type of control policy; in this way the amount of supplementary control information exchanged between the various processing units 3-1, 3-2, 3-3, . . . and utilized to implement the event-based control scheme is minimized or entirely eliminated.

The Applicant has carried out software simulations using twenty-four processors realized with a three-dimensional layout and ascertained that a distributed type of control policy allows to achieve an effective thermal control for a plurality of processing units 3-1, 3-2, 3-3.

Furthermore, the Applicant has conducted experimental tests using an Intel processor (for a desktop personal computer) comprising four (quad-core) processing units and ascertained again that the distributed type of control policy allows an effective thermal control.

One embodiment of the present disclosure relates to a method for controlling temperature and computing performance of at least one processing unit.

The control method comprises the steps of:
a) detecting the internal temperature of the processing unit;
b) generating, as a function of the values of the internal temperature, an event signal indicating the need to recalculate the value of at least one control signal controlling the computing performance of the processing unit and its dissipated thermal power;
c) calculating a control action for controlling the computing performance of the processing unit and its dissipated thermal power;
d) generating a first candidate driving signal carrying said control action;
e) generating the at least one control signal as a function of the first candidate driving signal.

In one embodiment the control method further comprises, between step d) and step e), the step of receiving a second candidate driving signal carrying a computational performance parameter, and wherein step e) comprises generating the at least one control signal as a function of the first candidate driving signal and of the second candidate driving signal.

In particular, step c) of the control method comprises the following sub-steps:
c1) detecting that the current value of the internal temperature signal differs from a stored internal temperature value by a value greater than or equal to the value of a variation in the threshold temperature and generating therefrom a temperature threshold event;
c2) detecting that the value of the interval of time comprised between the current time and the time wherein the previous temperature threshold or timeout event occurred is equal to a timeout value and generating therefrom a timeout event;
wherein the stored internal temperature value is the value of the internal temperature signal at the time wherein the previous temperature threshold or timeout event occurred.

In particular, step c2) of the control method comprises the following sub-steps:
c2.1) detecting the presence of a timeout event and increasing the timeout value up to a maximum timeout value (TM_max);
c2.2) detecting the presence of a temperature threshold event and assigning the timeout value as equal to a minimum timeout value (TM_min).

One embodiment of the present disclosure relates to a non-transitory computer-readable medium having a program recorded thereon, said computer-readable medium comprising software code portions running on the event generation module 2-1 and/or on the event management module 2-2.

The software code portions are adapted to perform the steps b)-e) of the control method, to perform the sub-steps c1), c2) of the control method and to perform the sub-steps c2.1), c2.2) of the control method, when the program is run on at least one computer.

The invention claimed is:

1. An electronic device to control temperature and computing performance of a processing unit, the electronic device comprising:
   an event generation logic circuit including a memory, an event management digital controller and an actuator driver including a digital controlled oscillator or a clock gating technique, wherein:
      the event generation logic circuit is configured to:
         receive an internal temperature signal representative of an internal temperature of the processing unit; and
         generate, as a function of values of the internal temperature signal, an event signal indicating a need to recalculate a value of a control signal controlling the computing performance of the processing unit and a dissipated thermal power of the processing unit;

the event management digital controller is configured to:
receive the event signal indicating the need to recalculate the value of the control signal;
calculate a control action for controlling the computing performance of the processing unit and the dissipated thermal power; and
generate a first candidate driving signal carrying said control action; the actuator driver is configured to:
receive the first candidate driving signal; and
generate the control signal as a function of the first candidate driving signal;

wherein the event generation logic circuit is configured to generate the event signal indicating a presence or an absence of a temperature threshold event, wherein the event generation logic circuit is configured to generate the presence of the temperature threshold event when a current value of the internal temperature signal differs from a stored value of an internal temperature by a value greater than or equal to a value of a threshold temperature variation, wherein the stored value of the internal temperature is a value of the internal temperature signal at a time where a previous temperature threshold event occurred or a timeout event occurred, wherein the event generation logic circuit is configured to generate the presence of the timeout event when a value of a time interval between a current time and the time when the previous temperature threshold event or the timeout event occurred is equal to a timeout value, and wherein the memory of the event generation logic circuit is configured to store the value of the stored internal temperature, the value of the threshold temperature variation, the timeout value and an event flag indicating whether a last event was the previous temperature threshold event or the timeout event.

2. The electronic device according to claim 1, the actuator driver being further configured to:
receive the first candidate driving signal;
receive a second candidate driving signal carrying a computing performance parameter;
generate at least one driving signal as a function of the first candidate driving signal and of the second candidate driving signal.

3. The electronic device according to claim 2, wherein the actuator driver further comprises:
a selection module configured to:
receive the first candidate driving signal;
receive the second candidate driving signal;
generate the at least one driving signal selected from the first candidate driving signal and the second candidate driving signal;
an actuator configured to receive the selected driving signal and to generate therefrom the control signal for controlling the computing performance of the processing unit and the dissipated thermal power.

4. The electronic device according to claim 1, wherein the event management digital controller is configured to dynamically change the timeout value, according to the following criteria:
receive the event signal indicating the presence of a timeout event and increase the timeout value up to a maximum timeout value;
receive the event signal indicating the presence of a temperature threshold event and assign the timeout value as equal to a minimum timeout value.

5. The electronic device according to claim 1, wherein the event generation logic circuit is implemented in hardware and comprises:
a time counter;
a logic gate of the OR type;
an equality comparator;
a magnitude comparator;
a subtractor circuit;
four registers to store the threshold temperature variation value, the stored temperature value, the timeout value and the event flag value, respectively.

6. The electronic device according to claim 5, wherein the event management digital controller is implemented in software and the digital controller has a proportional-integral-derivative action.

7. The electronic device according to claim 3, wherein the first candidate driving signal, the second candidate driving signal and the selected driving signal are respective clock signals having variable period values,
wherein the selection module is configured to generate the driving signal carrying the clock signal having a period value greatest from the value of the clock signal period of the first candidate driving signal and the value of the clock signal period of the second candidate driving signal,
wherein the actuator is selected from among the followings:
Dynamic Voltage and Frequency Scaling;
clock gating.

8. A system to control temperature and computing performance of the processing unit, the system comprising:
an electronic control device according to claim 2;
the processing unit comprising an internal temperature sensor configured to detect the internal temperature of the processing unit and to generate the internal temperature signal;
a computational load management module configured to receive a computational load signal representative of the computational load of the processing unit and to generate therefrom the second candidate driving signal;
wherein the actuator driver is configured to receive the event signal indicating the need to recalculate the value of the control signal and to generate the driving signal equal to the first candidate driving signal or equal to the second candidate driving signal.

9. The system according to claim 8, further comprising an external temperature sensor configured to detect the external temperature of the processing unit and to generate an external temperature signal representative of said external temperature,
wherein the event management digital controller is further configured to:
receive the internal temperature signal and the external temperature signal;
calculate an estimation of the thermal power dissipated by the processing unit, as a function of the values of the internal temperature signal, of the external temperature signal and of an estimation of the electrical conductance of the thermal path comprised between the position of the internal temperature sensor and the position of the external temperature sensor;
calculate the control action further taking into account said estimation of the dissipated thermal power.

10. The system according to claim 8, comprising a plurality of processing units and a respective plurality of electronic control devices according to claim 1, and wherein said plurality of processing units are processors for a desktop or laptop personal computer, smartphone, tablet or server, or they are graphics processors for a desktop or laptop personal computer, smartphone, tablet or server.

11. A method for controlling temperature and computing performance of a processing unit, the method comprising the steps of:
- a) detecting an internal temperature of the processing unit;
- b) generating, as a function of values of the internal temperature, an event signal indicating a need to recalculate a value of a control signal controlling the computing performance of the processing unit and a dissipated thermal power of the processing unit;
- c) calculating a control action for controlling the computing performance of the processing unit and the dissipated thermal power of the processing unit, wherein a temperature threshold event and/or a timeout event is generated by:
  - c1) detecting that a current value of the internal temperature differs from a stored value of an internal temperature by a value greater than or equal to a value of a variation in a threshold temperature and generating therefrom the temperature threshold event, wherein the stored value of the internal temperature is a value at the a time where a previous temperature threshold event occurred or a timeout event occurred;
  - c2) detecting that a value of an interval of time between a current time and the time when the previous temperature threshold event or the timeout event occurred is equal to a timeout value and generating therefrom the timeout event;
- d) generating a first candidate driving signal carrying said control action;
- e) generating the control signal as a function of the first candidate driving signal.

12. The method according to claim 11, further comprising, between step d) and step e), the step of receiving a second candidate driving signal carrying a computational performance parameter, and wherein step e) comprises generating the control signal as a function of the first candidate driving signal and of the second candidate driving signal.

13. The method according to claim 11, wherein step c2) comprises the sub-steps of:
- c2.1) detecting the presence of the timeout event and increasing the timeout value up to a maximum timeout value;
- c2.2) detecting the presence of a temperature threshold event and assigning the timeout value as equal to a minimum timeout value.

\* \* \* \* \*